(12) United States Patent
Kugele et al.

(10) Patent No.: US 6,302,445 B1
(45) Date of Patent: Oct. 16, 2001

(54) IRRIGATION PIPE SYSTEM

(75) Inventors: Adolf Kugele, McPherson; LaVern Schroeder, Hillsboro, both of KS (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/432,037

(22) Filed: Nov. 1, 1999

Related U.S. Application Data

(63) Continuation-in-part of application No. 09/158,373, filed on Sep. 22, 1998, now abandoned.

(51) Int. Cl.$^7$ .................................................. F16L 37/08
(52) U.S. Cl. ........................ 285/5; 285/360; 285/376; 285/401
(58) Field of Search .................................. 285/110, 111, 285/360, 361, 376, 395, 396, 401, 402, 5, 6, 197, 198, 199

(56) References Cited

U.S. PATENT DOCUMENTS

| | | | |
|---|---|---|---|
| 348,059 | 8/1886 | Schroeder | 285/360 |
| 831,224 | 9/1906 | Hammer | 285/361 X |
| 943,900 | * 12/1909 | Smith . | |
| 1,525,794 | * 2/1925 | Blake . | |
| 1,572,979 | * 2/1926 | Whybrew . | |
| 1,995,098 | 3/1935 | Healy | 285/376 X |
| 2,013,660 | 9/1935 | Lauer | 285/305 |
| 2,627,429 | * 2/1953 | Engelman | 285/110 |
| 2,823,807 | 2/1958 | Hempel | 285/5 X |
| 2,921,801 | * 1/1960 | Beyer | 285/111 |
| 2,923,308 | * 2/1960 | Shohan | 285/110 |
| 3,866,951 | 2/1975 | DeLoach | 285/5 |
| 3,971,573 | 7/1976 | Clements | 285/5 |
| 4,036,512 | * 7/1977 | Francis | 285/111 |
| 4,072,271 | * 2/1978 | Voss et al. . | |
| 4,527,745 | 7/1985 | Butterfield et al. | 285/376 X |
| 5,511,826 | 4/1996 | Clare et al. . | |

FOREIGN PATENT DOCUMENTS

| | | | |
|---|---|---|---|
| 707236 | 4/1965 | (CA) | 285/376 |
| 380607 | 12/1935 | (DE) | 285/5 |
| 828622 | * 1/1952 | (DE) | 285/361 |
| 2271623 | * 4/1994 | (GB) | 285/197 |
| 2274495 | 7/1994 | (GB) | 264/361 |
| 607102 | * 7/1960 | (IT) | 285/197 |

* cited by examiner

*Primary Examiner*—Teri Pham Luu
(74) *Attorney, Agent, or Firm*—Duane Morris & Heckscher LLP

(57) ABSTRACT

An irrigation pipe system including a tubular coupler member releasably connectable to fluid transport pipes. The tubular coupler member includes wing-like lateral projections for stabilizing and minimizing impact upon the tubular coupler member as it is drawn along a ground surface. Structure is provided for enabling a sprinkler riser to be connected to and disconnected from the tubular member by rotating the sprinkler riser less than about one rotation. A seal is also provided for preventing fluid leakage between the tubular coupler member and the sprinkler riser.

18 Claims, 11 Drawing Sheets

IRRIGATION PIPE SYSTEM

This application is a continuation-in-part of application Ser. No. 09/158,373, filed Sep. 22, 1998, abandoned.

FIELD OF THE INVENTION

The present invention relates to devices for coupling piping and, more particularly, to apparatus for coupling fluid transport piping for irrigation.

BACKGROUND OF THE INVENTION

Sprinkler irrigation has over the years replaced many other forms of irrigation methods because it minimizes erosion, prevents many drainage problems, does not require land leveling, and provides light application of moisture for irrigating crops.

Whenever a sprinkler system is referred to by name, the reference is usually made to the manufacturer's brand name. Sprinkler systems are typically classified by the degree of their portability. For example, there are permanent systems, fully portable systems which can be moved from one field to another, and semi-portable systems where the piping is movable but the pumping plant is in a fixed location.

A number of manufacturers currently provide fittings for sprinkler systems. These fittings include, for example, couplers, "L" and "T" shaped pipe connectors, reducers, T-type valves for maintaining hydrants, and valve-opener elbows. Such fittings typically appear every 20 to 40 feet along portable sprinkler laterals and, therefore, enable ready identification of the system's manufacturer.

In some respects, the couplers, as well as other fittings of existing systems possess similar characteristics. For example, most have either one or two replaceable rubber gaskets to prevent the loss of water between the pipe and the coupler when pressure is applied. Nearly all of these gaskets are made to permit water to drain out whenever the line is shut off and the pressure is released.

There are some differences, however, in the way the couplers of different manufactures fasten to a pipe. Some have a latch, others are bolted or welded and still others have one end rolled or pressed into the pipe. On most systems, the coupler makes a flexible joint which allows the sprinkler pipe to bend or form an angle with respect to the coupler. Some flexibility is desirable, particularly on rolling land.

Most couplers also have a guide or guard apron that helps to keep dirt from being scooped up when the pipe is inserted, or moved.

Current use of aluminum pipe couplers for sprinkler lines has evolved into several popular styles, including so-called "drop lock" or "no-latch" couplers and "tow line" or "drag line" couplers. These couplers are fitted with one of two styles of Chevron gaskets: a "drain" gasket which, at a predetermined pressure drop, is designed to leak water through the coupler and a "non drain" gasket which leaks water at a substantially lower pressure. A typical locking mechanism for existing couplers is a latch or band bolted or welded to the male end of a piece of aluminum tubing. Sprinkler pipe fittings are also normally fabricated from cast aluminum or galvanized steel. There are several manufacturers of these fittings, the basic styles of which have been in use since at least as early as 1970. For instance, a representative coupler may be provided with a ¾" or 1" female iron pipe thread to facilitate the installation of a metal (usually galvanized steel) riser of about 6" to 36" in length for supporting and delivering fluid to sprinklers of varying sizes.

This sprinkler-riser-coupler-aluminum tubing combination is light in weight and is commonly referred to as "hand movable" pipe. Such a system may be manually installed and removed, typically by about three individuals. The "drag line" or "tow line" styles can be pulled by tractor or machinery but it is necessary to manually install and disassemble the systems by two or more individuals.

In either towable or hand movable irrigation systems, the sprinkler coupler member may be provided with laterally projecting wings such as those described in U.S. Pat. No. 5,511,826. The purpose of such wings is to stabilize the coupler member, and thus protect the riser and sprinkler from damage, as the coupler is drawn along the ground. That is, the wings prevent "riser flop", i.e., rolling of the coupler member forwardly or rearwardly, during transport of the coupler member which might otherwise expose the riser and/or sprinkler to damage should the sprinkler impact the ground. Existing stabilizing wing designs, however, provide limited impact protection to the coupler member itself.

Existing towable or hand movable irrigation pipe coupler members also have an upwardly projecting, internally threaded, riser connection for threadably receiving the lower end of an externally threaded, sprinkler riser pipe. Among the deficiencies of current internally threaded riser connector designs is that the threaded connection can lose its sealing effect relatively soon after installation. As such, water may drain from the connection after the water supply is shut off, thereby causing water to pool in large areas and volumes around the coupler member. Such circumstances are disadvantageous in terms of water conservation and crop damage.

An advantage exists, therefore, for an irrigation pipe coupler member including means for protecting the coupler member from excessive impact damage as the coupler member is moved along the ground surface.

An further advantage exists for an irrigation pipe coupler member including means for enabling quick connection and disconnection of a sprinkler riser which minimizes water waste and crop damage.

SUMMARY OF THE INVENTION

The present invention provides an irrigation pipe system including a tubular coupler member having a pair of open ends wherein each open end is adapted to receive an end of a respective one of a first and second fluid transport pipe. The ends of the first and second pipes each include an annular recess which together comprise a first pair of annular recesses. The tubular coupler member includes a second pair of annular recesses adapted to align with the first pair of annular recesses to form a pair of annular cavities. The system further comprises a pair of flexible splines disposable through the tubular member and into the pair of annular cavities to releasably secure the first and second pair to the tubular coupler. A pair of gaskets is also disposed between the ends of the first and second pipes and the tubular coupler to prevent fluid leakage between the pipes and the coupler member.

The outer surface of the tubular coupler member preferably includes at least one winglike substantially tangential projection for stabilizing, i.e., preventing tipping, of the coupler member as it is drawn across a ground surface. A sprinkler riser fitting member is disposed on the outer surface of the tubular coupler member generally diametrically opposite the lateral projection(s).

According to a first embodiment of the invention, the sprinkler riser fitting member comprises a cylindrical member terminating in an outwardly directed, substantially annular flange. The flange defines at least one gap for receiving at least one inwardly directed lug of a riser lock member which is attached adjacent a lower end of a sprinkler riser. The at least one lug and the undersurface of the annular flange define cooperating means for enabling the sprinkler riser pipe to be quickly connected to or disconnected from the sprinkler riser fitting by rotating the sprinkler riser less than about one rotation, and preferably less than 180°.

According to a further embodiment, the sprinkler riser fitting means comprises an externally threaded fitting member and an internally threaded riser cap threadably connectable to the fitting member. The riser cap includes a cylindrical member terminating in an outwardly directed, substantially annular flange. The flange may be constructed substantially similar to the aforementioned riser fitting flange and may likewise cooperate with a correspondingly configured riser pipe lock member such as that briefly described above in connection with the first embodiment of the invention. Alternatively, the undersurface of the flange may be provided with one or more stop members. The stop members preferably protrude from the undersurface of the flange a distance sufficient to permit an inwardly directed lug of a riser lock member to overcome the stop members when sequential compressive and rotational force is exerted on the riser lock member yet also retain the riser lock member on the flange upon cessation of the aforesaid forces. So constructed, the sprinkler riser pipe may be quickly connected to or disconnected from the riser cap by pushing the riser pipe inwardly toward the coupler member a distance sufficient for the at least one lug to clear the at least one stop member and then rotating the sprinkler riser less than one rotation, and preferably less than 180°, about its longitudinal axis.

According to all presently preferred embodiments, the irrigation coupler system of the present invention includes seal means for preventing water leakage between the riser pipe and the riser fitting to promote water conservation and crop protection. In addition, the substantially tangential stabilizing projections are preferably configured for optional protection of the tubular member as it traverses the ground surface.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVETION

U.S. patent application Ser. No. 09/158,373, filed Sep. 22, 1998 is expressly incorporated by reference herein in its entirety.

Figure 1:
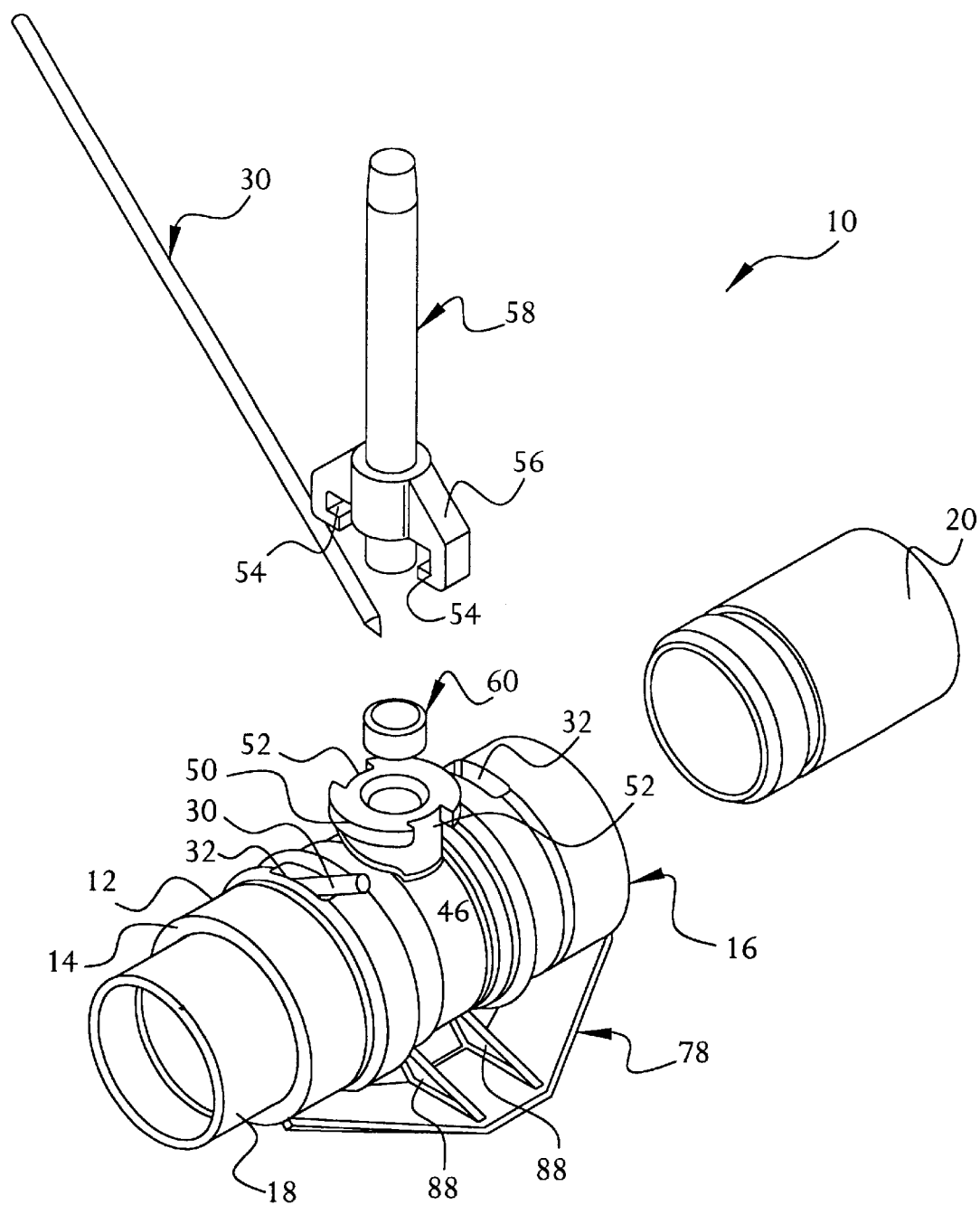
FIG. 1. is an exploded view of a first embodiment of an irrigation pipe system constructed according to the present invention.
Figure 2:
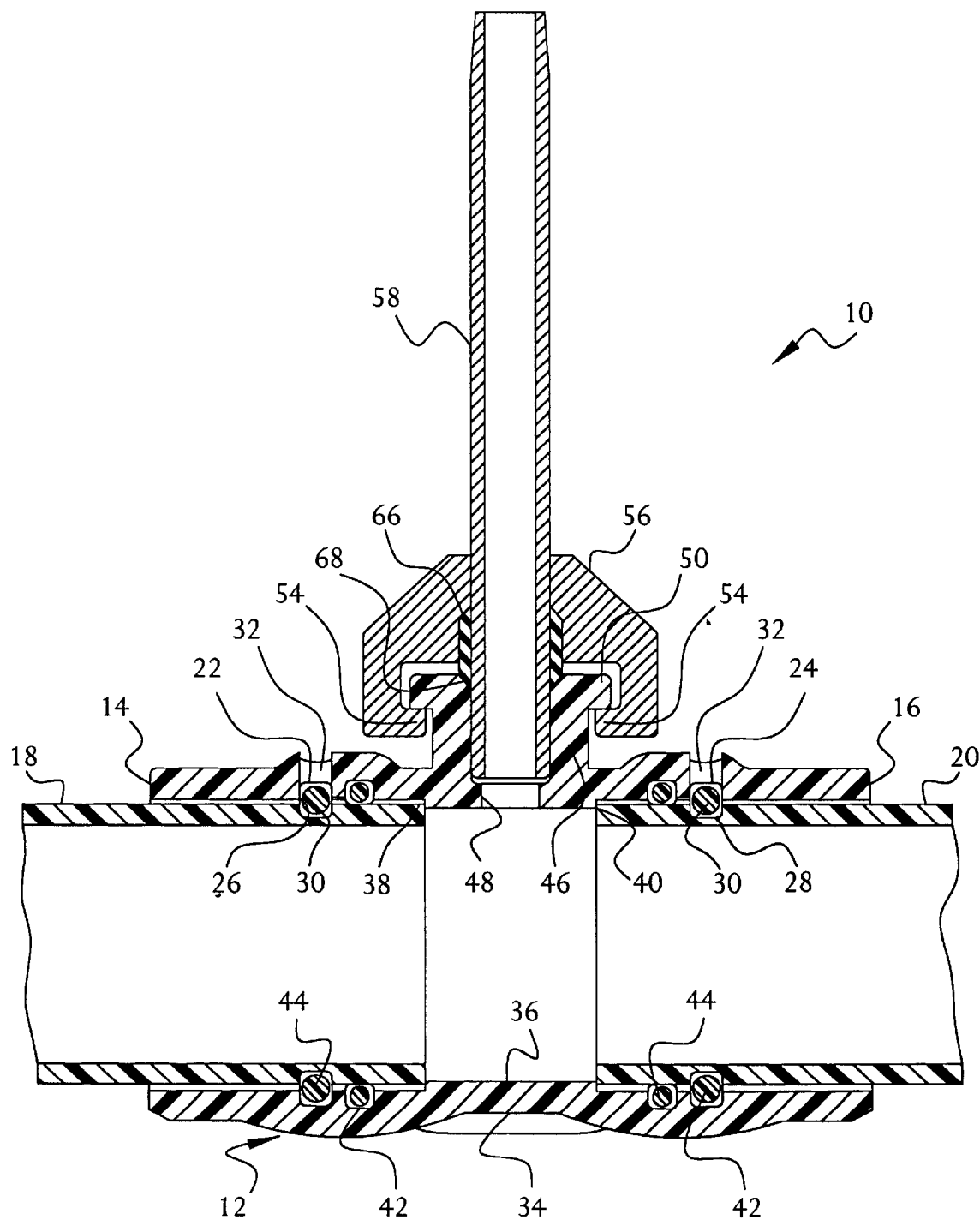
FIG. 2. is a longitudinal, elevational cross-section view of the irrigation pipe system of FIG. 1 in assembled condition.

Referring to FIGS. 1 and 2, there is illustrated a first embodiment of an irrigation pipe system, generally identified by reference numeral 10, constructed according to the present invention. System 10 comprises a tubular coupler member 12 having first and second open ends 14 and 16 adapted for connection to ends of first and second fluid transport pipes 18 and 20, respectively. Pipes 18 and 20 may be dimensioned to receive the ends 14, 16 of coupler member 12. More preferably, as illustrated, pipes 18, 20 are received in the ends of 14, 16 of the coupler member 12. Coupler member 12 and pipes 18, 20 may be fabricated from any suitable substantially rigid material such as metal or plastic. According to a presently preferred embodiment, these components are formed from polyvinyl chloride (PVC) or fiber reinforced resin. Pipes 18, 20 may be connected to coupler member 12 by any suitable releasable connection means such as cooperating threading or the like. However, it is more preferable that the coupler member 12 and pipes 18, 20 be joined by flexible spline connections of the type described, for example, in U.S. Pat. No. 5,511,826, the disclosure of which is incorporated herein by reference.

In a flexible spline connection, annular grooves are provided in the coupler member and the pipes that are to be connected to the coupler member. When the pipes are mated with the coupler member, the annular grooves align to form annular cavities. Thereafter, a flexible spline is inserted into and snugly received in the annular cavities to thereby prevent separation of the pipes from the coupler member.

As shown in FIG. 2, coupler member 12 is provided with a pair of annular grooves 22, 24 which cooperate with annular grooves 26, 28 respectively provided in pipes 18, 20.

Pipes 18, 20 are inserted into the open ends 14, 16 of coupler member 12 until the cooperating groove pairs 22, 26 and 24, 28 establish annular channels. Thereafter, flexible splines 30 are inserted through apertures 32 provided in the sidewall of the tubular member 12 which are in communication with annular grooves 22, 24 so as to essentially fill the annular channels to prevent separation of the pipes 18, 20 from the tubular coupler member 12. FIG. 1 shows one such spline 30 about to be inserted into one of the sidewall apertures 32 and the other spline nearly entirely inserted into the other sidewall aperture 32. The flexible spline 30 is preferably made of a synthetic resinous material, such as polyethylene, polypropylene, polystyrene, PVC, nylon, polyamide, and the like. Although these materials are flexible, they are designed to resist compression under the typical working pressures of most fluid piping systems. Additionally, since the flexible spline 30 is preferably not elastomeric, the resulting mechanical lock will not become unjoined unless and until the spline is removed back through the aperture 32 in the side wall. To facilitate removal, a small length of the spline 30 can be left outside of the coupler member 12 (as shown in FIG. 1) so that it can be grasped and removed.

Optionally, a molten or flowable polymer can be injected into the annular cavity through aperture 32 and then solidified to form a permanent mechanical lock.

A central region 34 of coupler member 12 is preferably provided with an inner annular surface 36 of somewhat reduced diameter the opposite edges of which define shoulders 38, 40 (FIG. 2) against which the ends of pipes 18, 20 come to rest when inserted in coupler member 12. Shoulders 38, 40 assure precise alignment of groove pairs 22, 26 and 24, 28 and provide firm seating of the pipes 18, 20 within the coupler member 12. Additionally, either the pipes 18, 20 or, as illustrated, the tubular coupler member 12 are provided with additional annular grooves 42 for receiving elastomeric O-rings or similar sealing or packing means 44 to prevent fluid leakage between the pipes 18, 20 and the coupler member 12.

A cylindrical fitting member 46 projects from the sidewall of the coupler member in the central region thereof. Fitting member 46 is provided with a central passageway 48 to establish fluid communication between the fitting member 46 and the interior of the coupler member 12. The fitting member 46 terminates in an outwardly directed, substantially annular flange 50.

Figure 4:
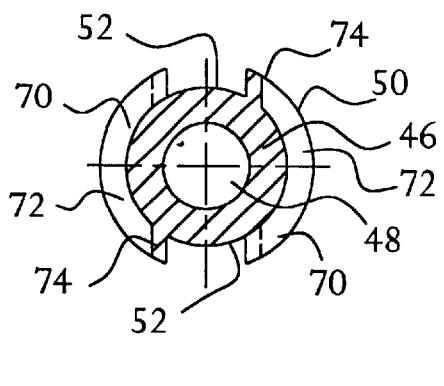
FIG. 4. is a cross-section view taken along line A—A of FIG. 3.
Figure 7:
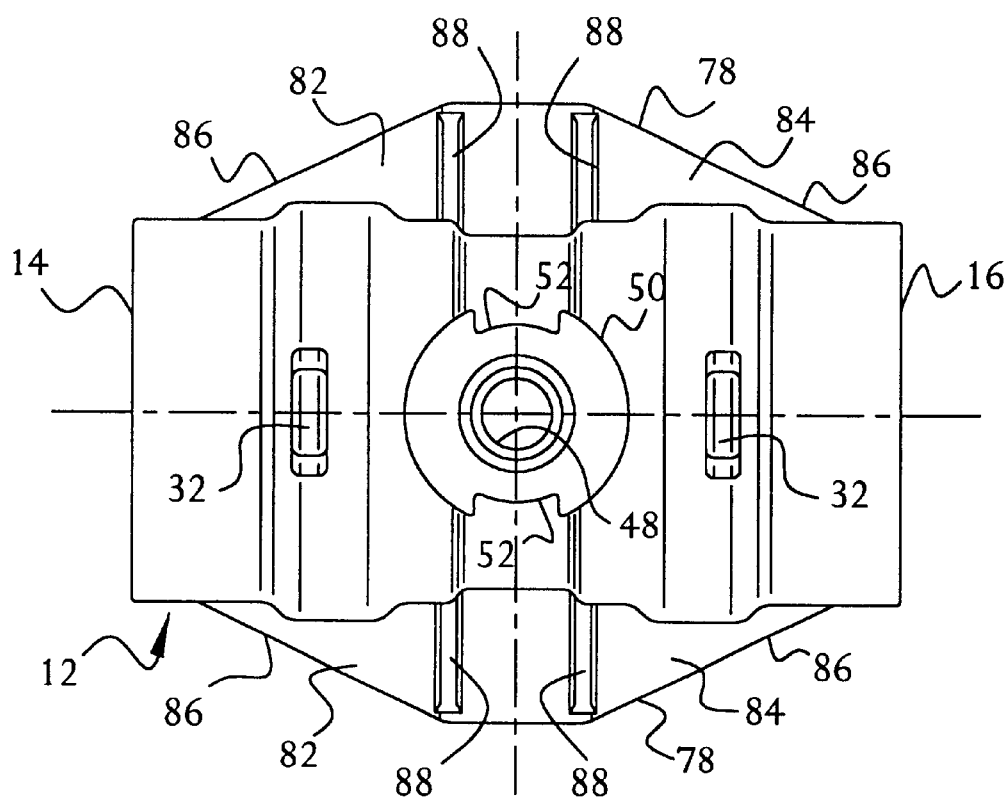
FIG. 7. is a top plan view of a tubular coupler member of the irrigation pipe system of FIG. 1.
Figure 8:
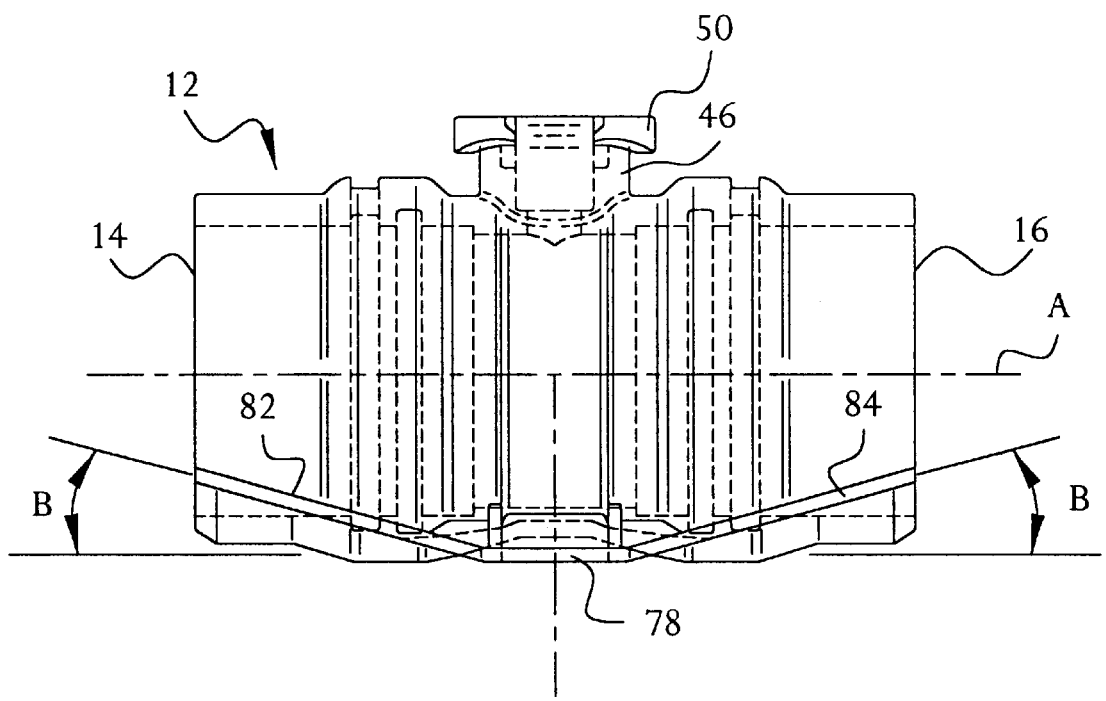
FIG. 8. is a longitudinal, side elevation view of the tubular coupler member of the irrigation pipe system of FIG. 1.
Figure 9:
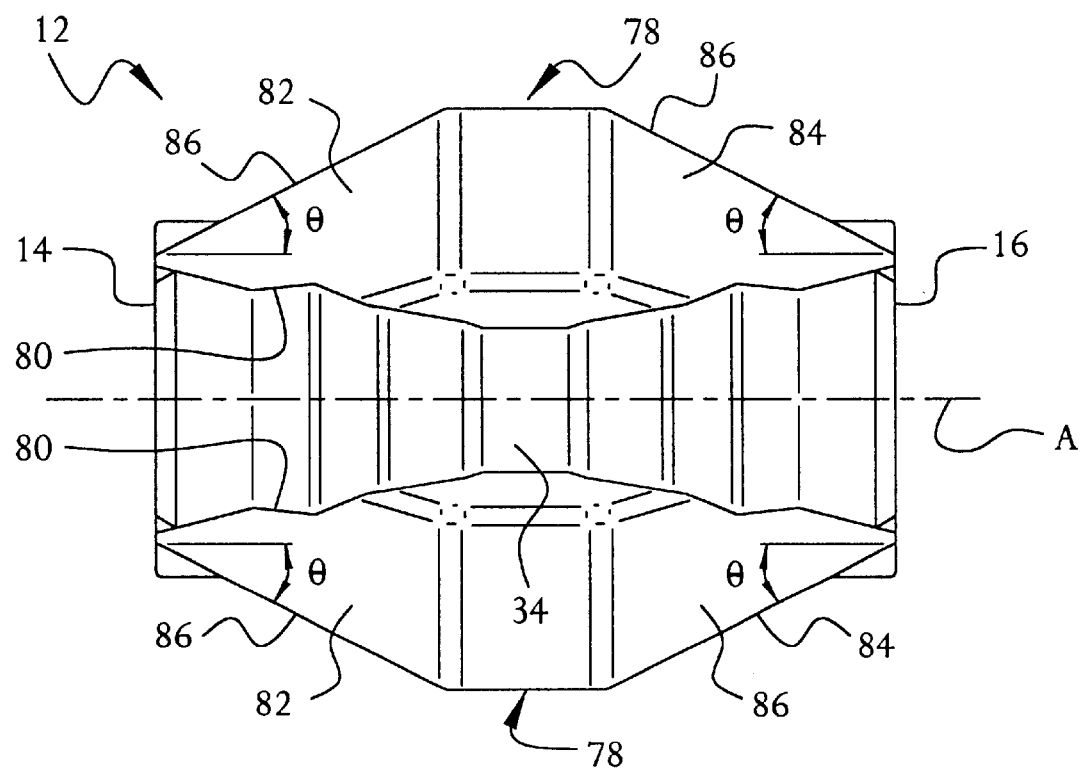
FIG. 9. is a bottom plan view of the tubular coupler member of the irrigation pipe system of FIG. 1.

As illustrated most clearly in FIGS. 1, 4 and 7, flange 50 is provided with at least one or more, preferably two or more, gaps 52. The gaps 52 are of suitable size and disposition to receive a corresponding number of inwardly directed fingers or lugs 54 of a riser lock member 56 (FIGS. 1 and 2). The riser lock member 56 is preferably fixedly attached adjacent a lower end of a sprinkler riser 58, the upper end of which riser is typically threadably connectable to a sprinkler (not illustrated). Both the sprinkler riser 58 and the riser lock member 56 are desirably formed from compatible rigid materials, either metallic or plastic. For example, the riser lock member and sprinkler riser may both be manufactured from aluminum, zinc, PVC or fiber reinforced resinous plastic. If made of metal, the riser lock member 56 may be screwed, riveted or welded to the sprinkler riser 58. If formed from plastic these parts may joined adhesive bonding, solvent bonding or, alternatively, they may be molded as a single unit.

The lugs 54 engage the undersurface of flange 50 in the manner shown in FIG. 2. That is, once the lugs have passed through corresponding gaps 52 in flange 50, the riser lock member 56 and sprinkler riser 58 are rotated about the longitudinal axis of the sprinkler riser whereby the lugs come into sliding contact with undersurface of the flange.

Figure 6:
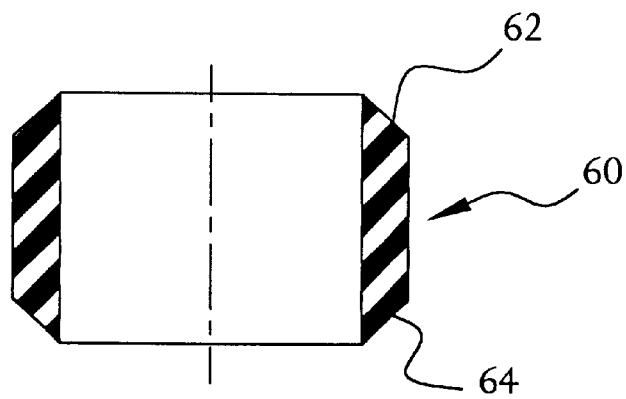
FIG. 6. is an enlarged, elevational cross-section view of a sprinkler riser shaft seal of the irrigation pipe system of FIG. 1.

A cylindrical elastomeric shaft seal 60 (FIGS. 1, 2 and 6) is desirably provided between the riser lock member 56 and fitting member 46 to prevent leakage between the sprinkler riser 58 and the riser lock member. Shaft seal 60 may be made of any suitable natural or artificial rubber or rubber-like compound having a durometer of about 70. As seen in FIG. 6 the upper and lower edges 62, 64 of the shaft seal are preferably beveled, as are the seating surfaces 66, 68 provided therefor in the riser lock member 56 and cylindrical fitting member 46 (FIG. 1).

To promote axial compression of shaft seal 60, which compression is converted to radial expansion of the seal for enhancing the sealing effect thereof, the undersurface of the flange is desirably provided, for each lug 54 that engages therewith, a camming surface 70 (FIGS. 3, 4 and 5) defining an angle of between about 5° to about 10° with respect to horizontal. Hence, as the lugs 54 slidingly and rotatingly pass along the camming surfaces 70 the riser lock member 56 axially squeezes the shaft seal 60 which causes the seal to fill any gaps between the seal and the riser lock member 56, the cylindrical fitting member 46 and the sprinkler riser 58. To reduce wear of both the lugs 54 and camming surfaces 70, at least a portion of the upper surfaces of the lugs 54 is provided with a slope which substantially corresponds to the slope of the camming surfaces 70.

Contiguous with each camming surface 70 the undersurface of flange 50 is preferably provided with a substantially horizontal landing surface 72 which seats the sprinkler riser with respect to the coupler member. The landing surface preferably terminates in a stop member 74 to prevent over-rotation and undesirable slippage of the lugs 54 into gaps 52. When in engagement with the landing surfaces 72, the lugs 54, under the compression spring type force exerted by seal 60 and through their integral connection with the riser lock member 56 and sprinkler riser 58, securely and sealingly connect the sprinkler riser 58 to the coupler member 12.

Figure 5:
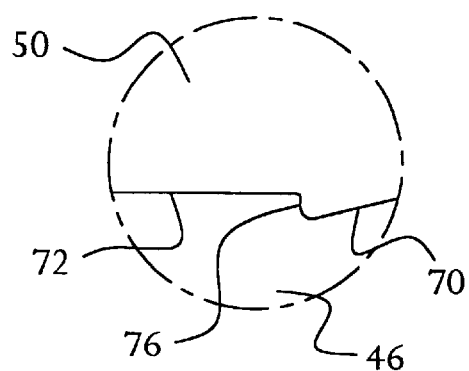
FIG. 5. is an enlarged view of encircled portion B of FIG. 3.

As most clearly shown in FIG. 5, the lowermost ends of the camming surfaces 70 are preferably slightly downwardly displaced with respect to the landing surfaces 72 to establish stop shoulders 76 for the lugs 54 to ensure that the sprinkler riser 58 does not become disconnected from the coupler member 12 through inadvertent reverse rotations of the sprinkler riser 58 and/or the riser lock member 56. Thus, when one wishes to remove the sprinkler riser 58 from the coupler member 12, the sprinkler riser or, more preferably, the sprinkler riser lock member 56 is grasped and rotated in a direction opposite the direction of installation until the lugs come into contact with stop shoulders 76. At this point the sprinkler riser 58 and/or riser lock member 56 is pressed inwardly toward the coupler member 12 a distance sufficient to permit passage of the lugs 54 beneath the stop shoulders 76 whereby reverse rotation of the sprinkler riser may continue. Once the lugs 54 come into alignment with gaps 52, the sprinkler riser 58 and riser lock member 56 may simply be lifted from engagement with the coupler member 12. The aforementioned components thus collectively function as sprinkler riser connection means for releasably connecting the sprinkler riser 58 to the coupler member 12 by rotating the sprinkler riser less than about one rotation, and preferably less than about 180°, about its longitudinal axis.

Referring to FIGS. 1, 3, 7, 8 and 9 there illustrated a further presently preferred aspect of the irrigation pipe system according to the present invention. The irrigation pipe systems described herein are not fixed with respect to the land they irrigate. That is, they may be manually or mechanically towed across the land to any desired location. Unless care is taken during towing, however, the system may be jostled to an extent where the various components may become inadvertently loosened or the coupler may rotate about its longitudinal axis to the point where the sprinkler riser "flops" to the ground which may result in damage to the sprinkler riser or sprinkler.

Figure 3:
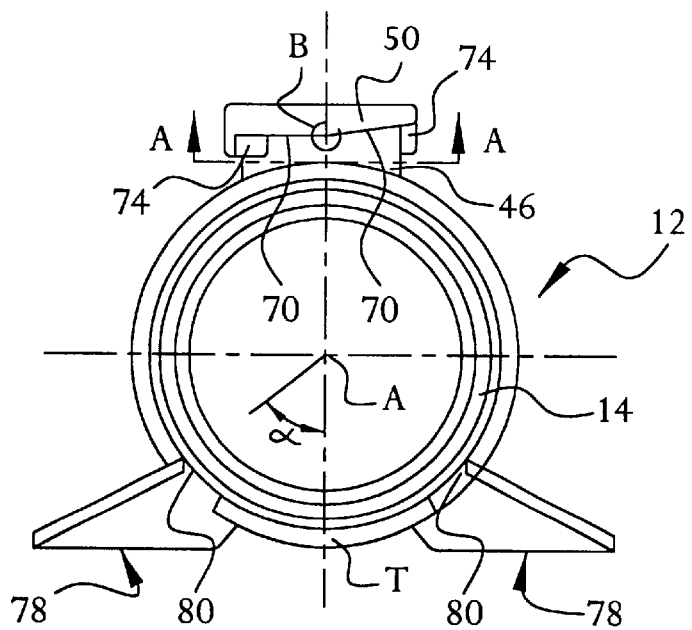
FIG. 3. is an end view of a tubular coupler member of the irrigation pipe system of FIG. 1.

Accordingly, the present invention provides means for reducing impact and coupler member rolling during towing of the irrigation pipe system. Preferably, these means comprise at least one or, more preferably, two wing-like lateral projections 78 disposed on an outer surface of the coupler member 12 and extending substantially tangentially thereto. As used herein, the phrase "substantially tangentially" shall be construed to mean that any portion of the proximate edges 80 of the lateral projections 78 at which the lateral projections are joined to the coupler member 12 (FIGS. 3 and 9) may be disposed either at a true tangent with respect to the outer surface of the tubular member or, as illustrated in FIG. 3, up to an arc length corresponding to an angle of no greater than about 60° with respect to the point of tangency "T".

Each lateral projection 78 preferably includes first and second end portions 82, 84. As most clearly depicted in FIG. 8, each of the first and second and portions 82, 84 are respectively disposed toward a central longitudinal axis "A" of the coupler member 12 in a plane extending at an angle B of about 10° to about 20°, and more preferably about 15°, with respect to the central longitudinal axis "A°. Such angular disposition of the first and second portions 82, 84 of the lateral projections 78 reduces the impact experienced by the coupler member as it traverses the ground during towing.

Additionally, each of the first and second end portions 82, 84 of the lateral projections 78 includes a distal edge 86 (FIGS. 7 and 9) extending outwardly from a respective one of the first and second open ends 14, 16 of the coupler member 12 toward said central region 34 thereof at an angle θ of about 15° to about 35°, and more preferably about 27°, with respect to the central longitudinal axis A. This substantially linear and comparatively shallow-angled distal edge 86, when serving as a leading edge of the lateral projection 78 in the direction of towing, reduces the resistance and minimizes the impact experienced by the coupler member as it is towed across the ground.

Preferably, each lateral projection 80 is structurally reinforced by one or more gusset plates or similar reinforcement 88 extending between the lateral projections and the outer surface of the coupler member 12 (FIGS. 1 and 7).

Figure 10:
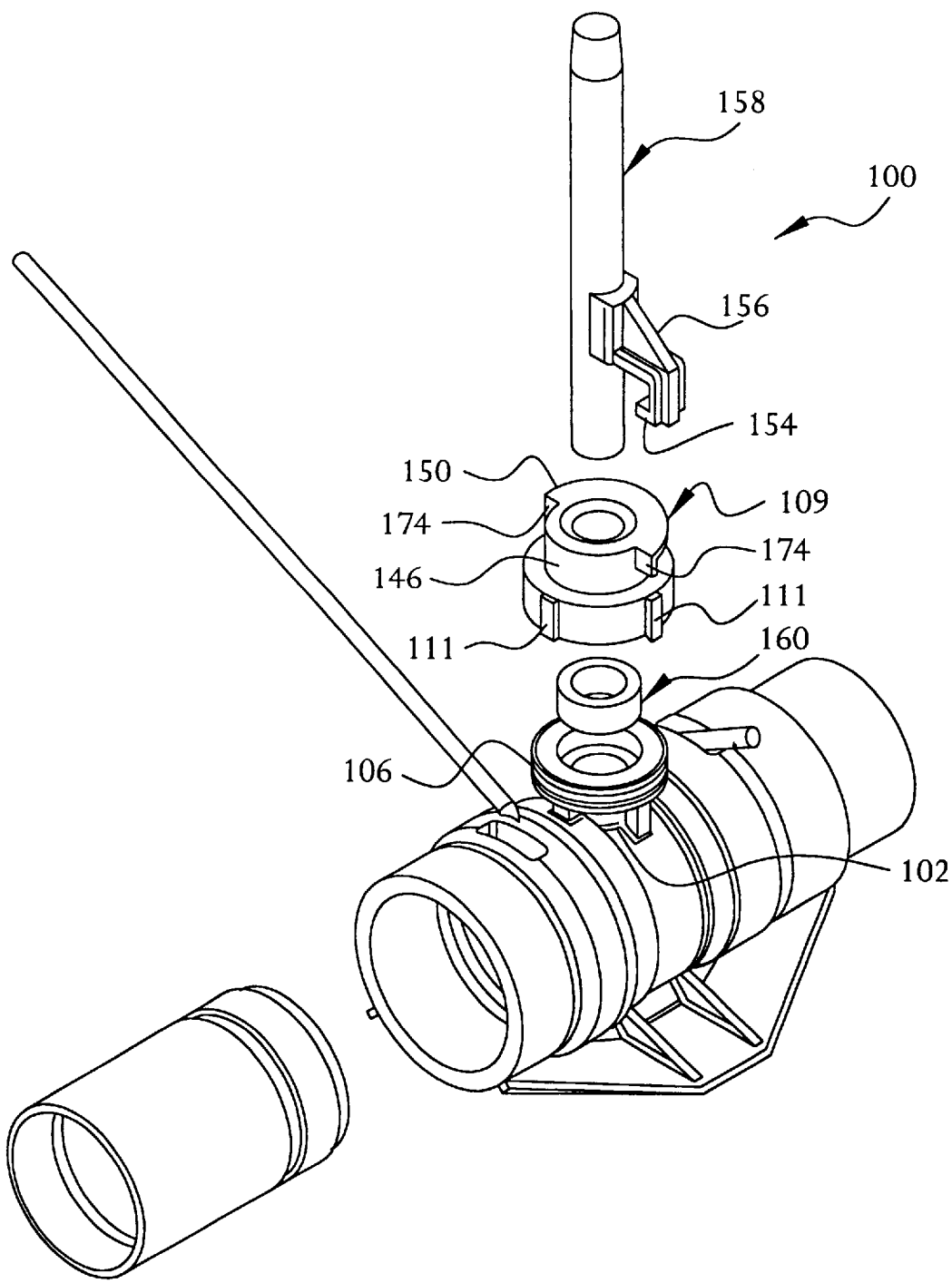
FIG. 10. is an exploded view of a further embodiment of an irrigation pipe system constructed according to the present invention.
Figure 11:
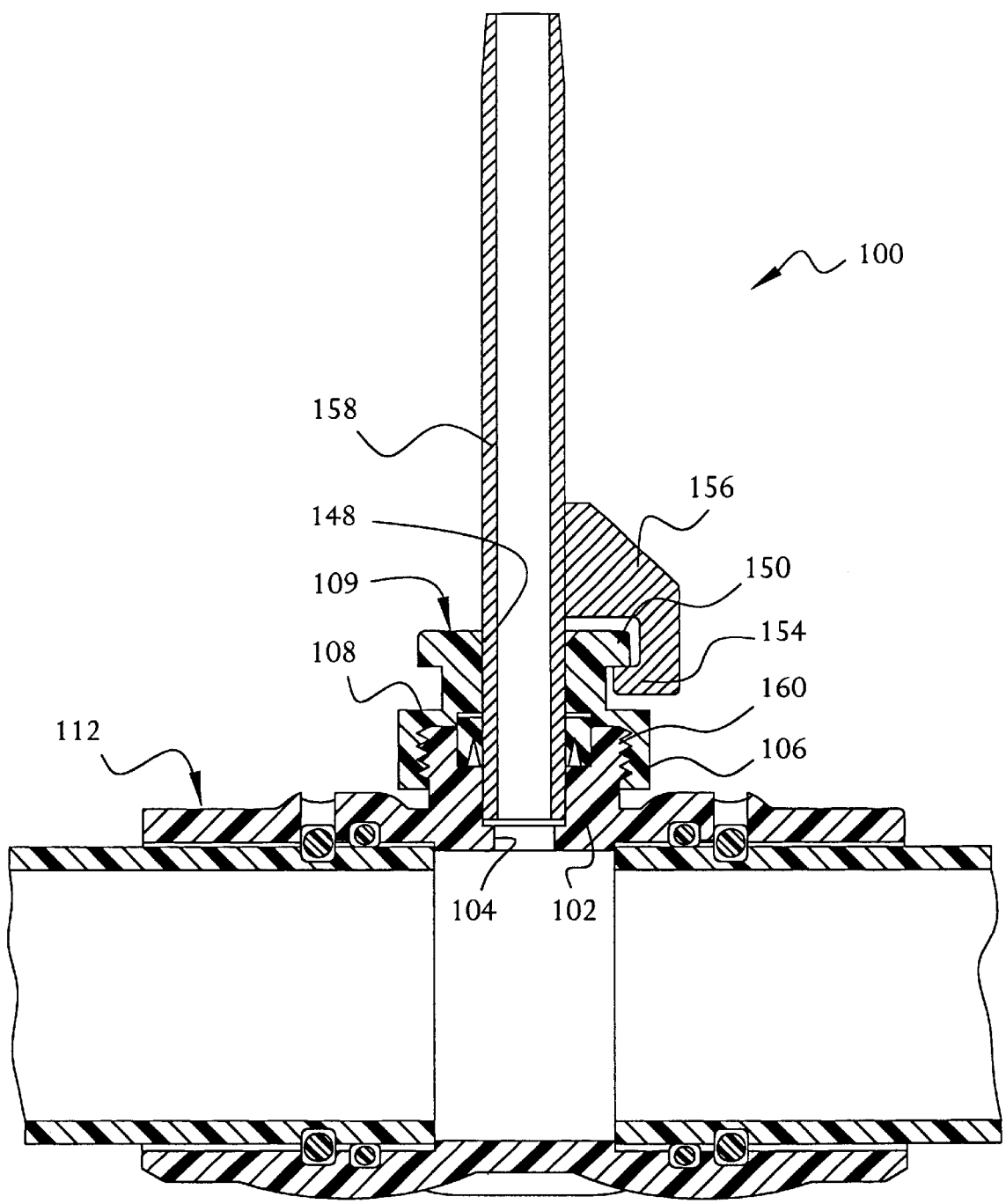
FIG. 11. is a longitudinal, elevational cross-section view of the irrigation pipe system of FIG. 10 in assembled condition.
Figure 12:
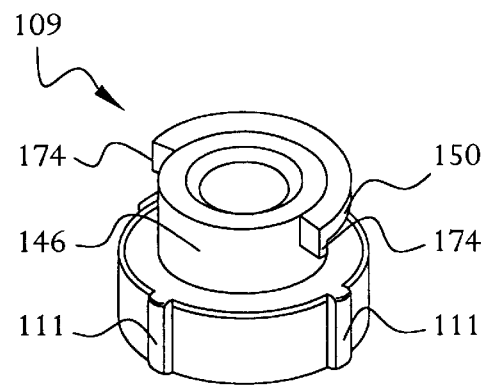
FIG. 12. is a perspective view of a sprinkler riser cap of the irrigation pipe system of FIG. 10.

Referring to FIGS. 10 and 11, there is illustrated a further embodiment of an irrigation pipe system, generally identified by reference numeral 100, constructed according to the present invention. System 100 is in many respects constructed substantially similar to system 10 discussed above. Accordingly, only those elements of system 100 which materially depart in structural configuration and/or function from their counterparts in FIGS. 1–9, or which are otherwise necessary for a proper understanding of the invention, will be described in detail.

Figure 14:
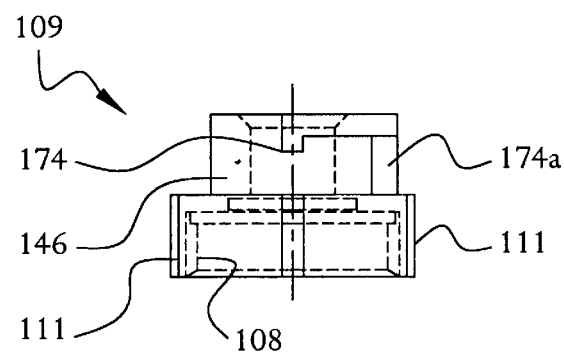
FIG. 14. is a side elevation view of the sprinkler riser cap of the irrigation pipe system of FIG. 10.
Figure 16:
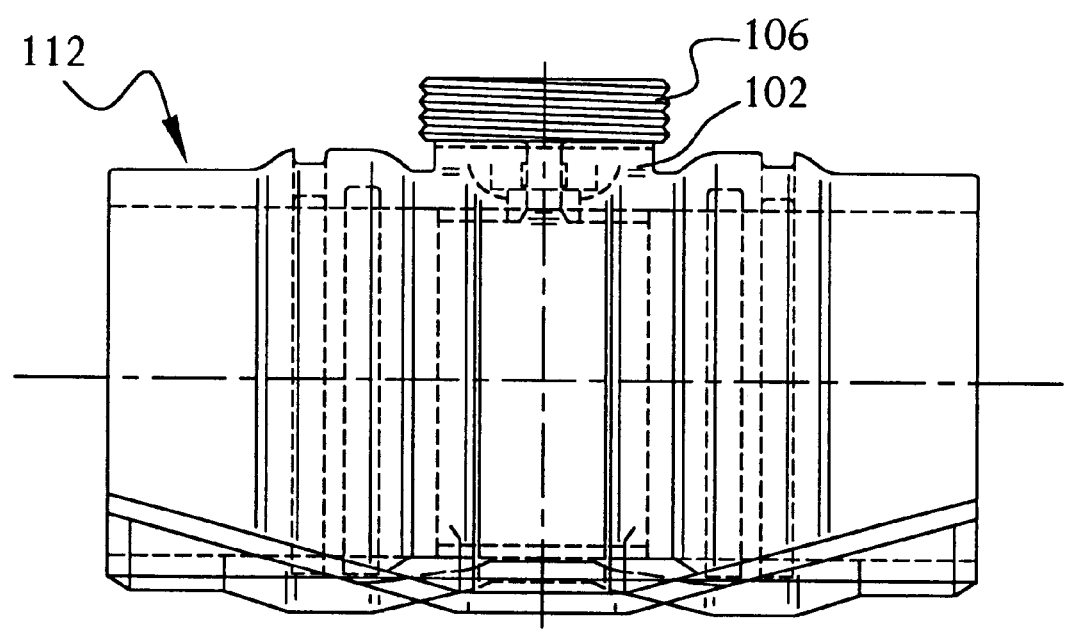
FIG. 16. is a longitudinal, side elevation view of a tubular coupler member of the irrigation pipe system of FIG. 10.

A significant distinction between system 10 and system 100 lies in the construction of its sprinkler riser connection means. More particularly, system 100 includes a cylindrical riser adapter 102 having a central passageway 104 in fluid communication with the interior of tubular coupler member 112. Riser adapter 102 is preferably provided with external threading 106 (FIGS. 10, 11 and 16) which matingly engages with internal threading 108 of a riser cap 109 (FIGS. 11 and 14). The use of external threading 106 improves the strength of the riser adapter 102 by providing a thicker and stronger adapter wall reinforced by external threads which function as support bands to minimize cracking of the riser adapter 102 due to bending forces created by physical manipulation and incidental impact of the sprinkler riser 158. Moreover, each of systems 10 and 100 overcome the problems of currently existing internally threaded riser connector designs which readily lose fluid seal and allow water waste and promote water pooling and crop damage in the vicinity of the sprinkler. Riser cap 109 may be fabricated from metal or, more preferably, PVC or fiber reinforced resinous plastic material. In addition, the exterior surface of the riser cap is preferably provided with one or more protrusions 111 to facilitate its manual installation and removal from the riser adapter 102.

FIGS. 10 through 14 reveal that the riser cap 109 includes a cylindrical fitting member 146 having a central passageway 148 to accommodate sprinkler riser 158. The fitting member 146 terminates in an outwardly directed, substantially annular flange 150. Flange 150 is provided with at least one gap 152 (FIG. 13) of suitable size to receive at least one inwardly directed finger or lug 154 of a riser lock member 156 (FIGS. 10 and 11). The riser lock member 156 and sprinkler riser 158 are preferably formed of compatible rigid materials and may be attached to one another in the manner of riser lock member 56 and sprinkler riser 58 described hereinabove in connection with FIGS. 1 through 9.

Figure 13:
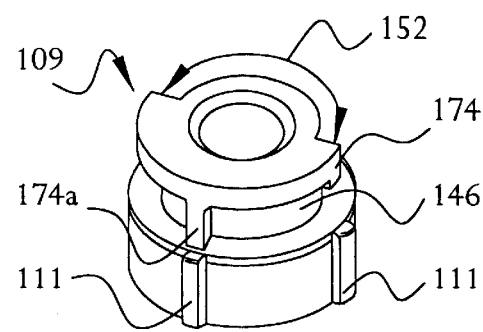
FIG. 13. is another perspective view of the sprinkler riser cap of the irrigation pipe system of FIG. 10.

Lug 154 engages the undersurface of flange 150 in the manner shown in FIG. 11. That is, the lug 154 is passed through gap 152 and pressed downwardly until it clears a stop member 174 protruding from the undersurface of the flange 150. Thereafter, the sprinkler riser 158 is rotated and released such that the lug 154 comes into contact with the undersurface of the flange 150. Preferably, flange is provided with at least two such stop members 174 whereby the user may selectively rotate the sprinkler riser in either direction to connect or disconnect the sprinkler riser to and from the coupler member 112. As seen in FIGS. 13 and 14, an additional and optional stop member 174a may be provided to limit the range of rotation of the lug 154 to about 90° when engaged with the undersurface of flange 150.

As the lug is pressed downwardly over stop member 174 and comes to rest against the flange 150, it axially compresses a sprinkler riser shaft seal 160 thereby causing the seal to radially expand and prevent fluid leakage between the seal, the riser adapter 102, and the riser cap 109. The preferred construction of seal 160 is shown in 15. Conversely, seal 160 functions in the manner of a compression spring to releasably yet firmly maintain contact of lug 154 with flange 150.

Seal 160 may be made from any natural or artificial rubber or rubber-like material having a durometer of about 70. It preferably has a bifurcated construction such that the lower portion thereof is separated into spaced apart annular ridges 160a, 160b which define an annular gap 160c therebetween. The gap 160c may be filled with fluid during operation of system 100, thereby spreading the ridges 160a, 160b and enhancing the sealing effect of the seal.

Like those described above in connection with system 10, the sprinkler riser connection means of system 100 enable the sprinkler riser 158 to be connected to and disconnected from the coupler member 112 by rotating the sprinkler riser less than one rotation, and preferably less than about 180°, about its longitudinal axis. As such, each design offers substantial time savings in respect to installation, removal and maintenance versus other irrigation sprinkler systems, especially other large-scale systems, presently known in the art.

Referring again to FIGS. 10 and 11, another aspect of the invention is an irrigation pipe coupler 100 comprising a tubular member 112 having a central longitudinal axis, a central region and first and second open ends. The first and second open ends are adapted for respective connection to first and second pipes. A fitting 102 includes a cylindrical member in fluid communication with the tubular member. The fitting 102 is capable of receiving a sprinkler riser in a locking relationship with the fitting. The fitting 102 includes an externally threaded fitting member 106 and an internally threaded fitting member 109 threadably connectable to the externally threaded fitting member. A seal 160 is compressible between the externally threaded fitting member 106 and the internally threaded fitting member 109, for forming a seal between the cylindrical member and the sprinkler riser 158.

The sprinkler riser 158 has a lock member 156 having a lug 154 connected thereto, and the fitting 106 has an undersurface of the fitting, for receiving the lug, to lock the sprinkler riser 158 to the externally threaded fitting member 106 or the internally threaded fitting member 109.

In the example, the undersurface is on the bottom of a flange portion 150. In other variations (not shown) of the exemplary embodiments, the mating undersurface may alternatively be an undersurface of the externally threaded fitting member or an undersurface of the internally threaded riser cap.

In the exemplary embodiment, the cylindrical member (which is connected to the tubular member 112) is a part of the externally threaded fitting member 106, and the internally threaded fitting member is the riser cap 109. In an alternative embodiment (not shown), the cylindrical member connected to the tubular member may have an internal thread, and the riser cap may be in the form of an externally threaded plug having a central bore for receiving the sprinkler riser 158. The plug would be configured to engage and compress the seal 160 in the same way as riser cap 109.

Figure 15:
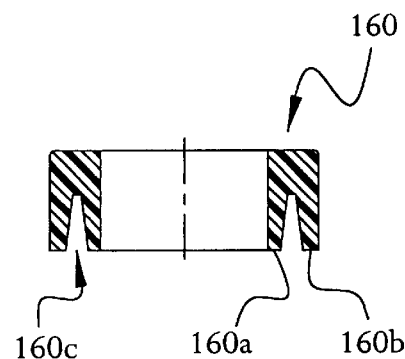
FIG. 15. is an enlarged, elevational cross-section view of a sprinkler riser shaft seal of the irrigation pipe system of FIG. 10.
Figure 17:
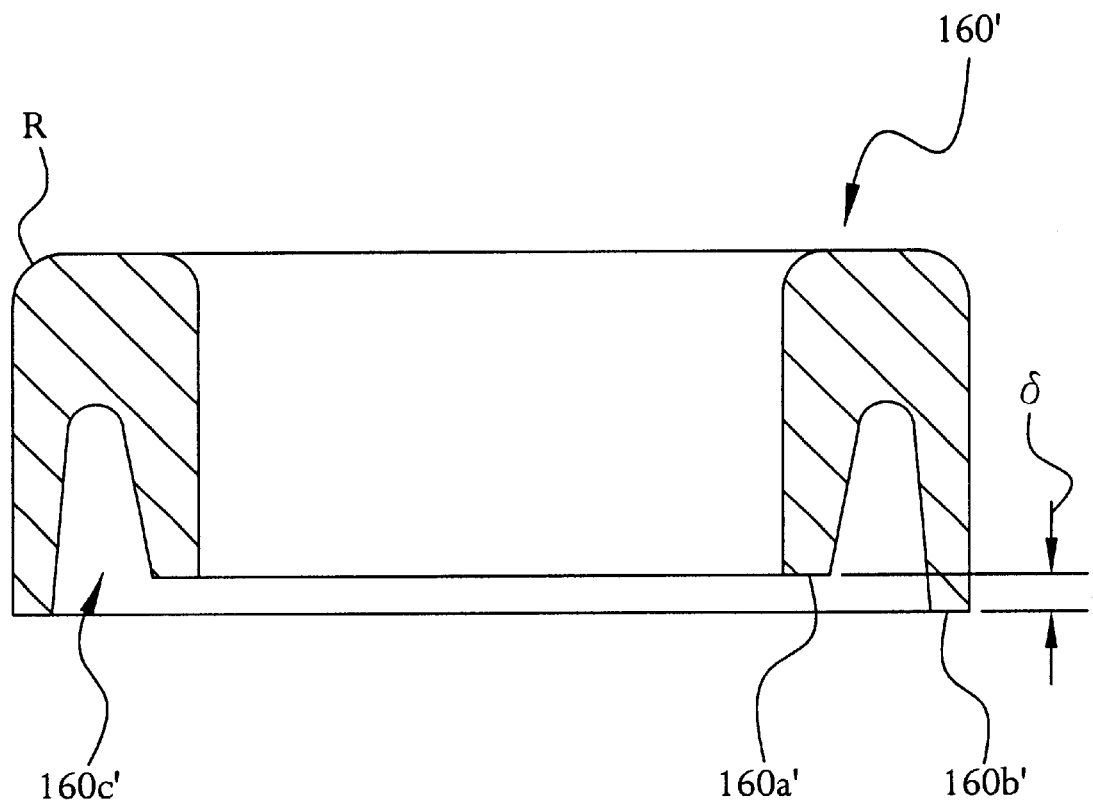
FIG. 17 is a cross sectional view of an enlarged, elevational cross-section view of a variation of the sprinkler riser shaft seal of the irrigation pipe system of FIG. 10.
Figure 18:
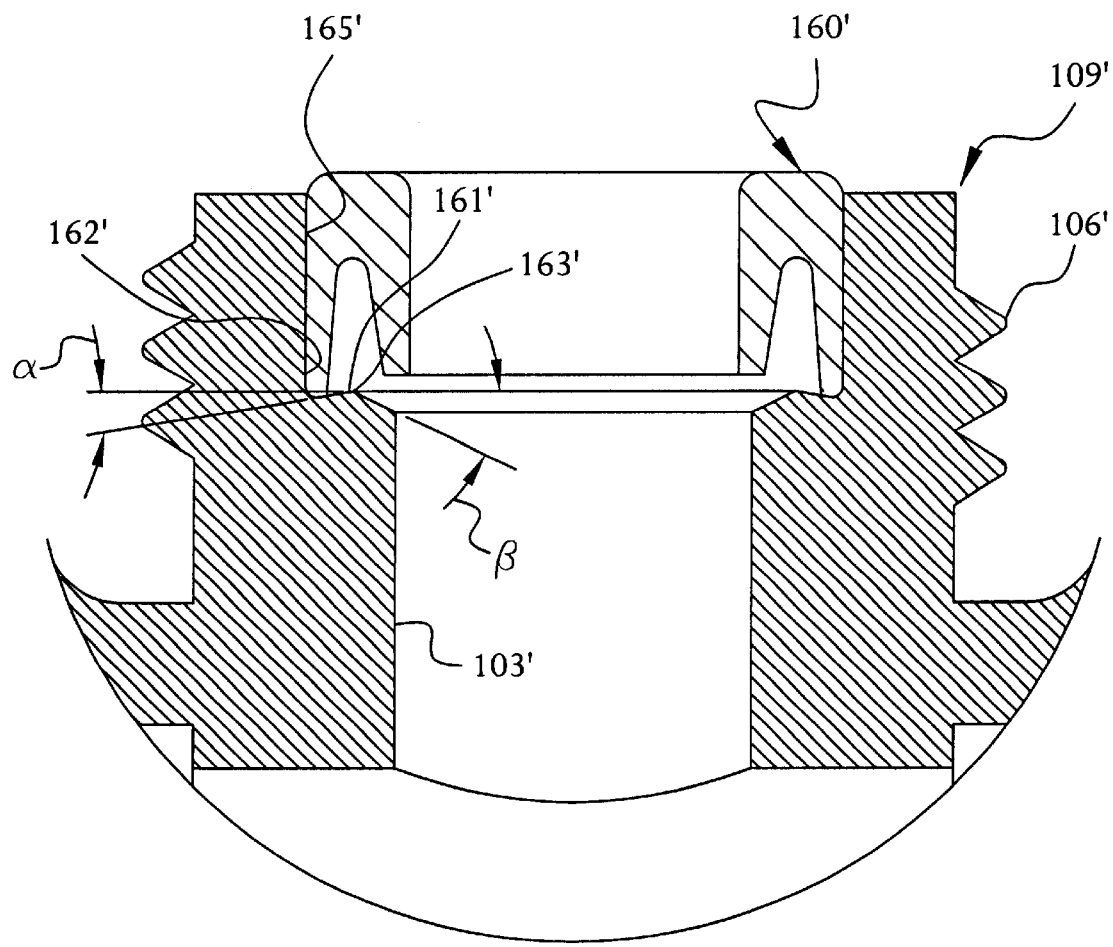
FIG. 18 is an enlarged cross sectional view of a variation of the externally threaded fitting member of FIG. 11.

FIGS. 17 and 18 show a variation of the exemplary embodiment, in which the seal 160' has a bifurcated construction, such that a portion thereof is separated into inner and outer spaced apart annular ridges 160a' and 160b', respectively. Seal 160" differs from the seal 160 shown in FIG. 15 in the following significant respects: Either the internally threaded fitting member 109 or the externally threaded fitting member 106 has a bore 103' for receiving the seal 160'. In the example, the externally threaded fitting member 106 has the bore 103'. The outer annular ridge 160b' of the seal 106' has a height that is greater than a height of the bore 103'. The inner annular ridge 160a' is shorter than the outer annular ridge 160b'. The height of the inner annular ridge 160a' is smaller than the height of the bore 103'. Additionally, as shown in FIG. 18, the seal 160' seats on a seating surface 161' of the externally threaded fitting member 106'. The seating surface 161' has an angle α, so that the seating surface is deeper at an outer circumference 162' than at an inner circumference thereof 162'. The angle α is about 5 degrees. In addition, a bevel angle β of about 25 degrees is provided at the inner circumference of the seating surface 161'.

The variations shown in FIGS. 17 and 18 improve the sealing of the coupling 100, seal 160' and threaded cap joint by providing a positive mechanical seal between these components. The mechanical sealing is achieved when the threaded cap 109 is tightened onto the seal 160'. The taller seal of FIGS. 17 and 18 is compressed into the coupling bore 103' by the cap 109. The angle α causes the outer lip of the seal 160' to expand against the wall 165' of the cap 106', thus providing a pre-loaded mechanical seal between the sprinkler riser 158 and the threaded cap 106'. This sealing effect is independent of fluid pressure.

The radius R at the outside diameter of the seal 160' prevents the pinching of the seal 160' as it is compressed by the threaded cap. The radius R may be, for example, about 0.06 inches (1.5 millimeters).

The shorter inner lip 160a' prevents pinching of the seal 160' between the bore 165' and the riser 158 during riser pipe installation.

Although the embodiments of the sprinkler riser fitting means disclosed herein are preferred because of their comparative ease of manufacture, it is contemplated that other designs of such means will become apparent to the reader which are consistent with the scope and sprit of the present invention. For instance, the one-piece sprinkler riser fitting member 46 of system 10 may be constructed as a two-part assembly similar to the threaded fitting 102 and riser cap 109 arrangement of system 100, and vice versa. Similarly, the fitting members 46, 146 may terminate in gapped, inwardly directed flanges rather than gapped outwardly directed flanges. Thus, the lugs 54, 154 may be outwardly rather than inwardly directed in order to engage with such flanges.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An irrigation pipe system comprising:

a tubular coupler member having at least one open end;

at least one fluid transport pipe;

means for releasably connecting said at least one fluid transport pipe to said at least one open end;

a sprinkler riser having a bottom end;

a fitting including a lock member having a lug connected to said sprinkler riser and a cylindrical member attached to and in fluid communication with said tubular coupler member, said cylindrical member terminating in a substantially annular flange, said flange having an undersurface with a flat portion and at least one gap for receiving said at least one lug, said undersurface of said flange having a plurality of stops;

whereby said sprinkler riser is connected to said cylindrical member by inserting the bottom end of said sprinkler riser inside said cylindrical member, pushing said sprinkler riser into the cylindrical member in a direction towards tubular coupler member a distance sufficient for said at least one lug to clear one of said plurality of stops, and rotating said sprinkler riser till said lug is past said one stop, wherein said stops are spaced so as to limit a range of rotation of the lock member, when the lug is in contact with the flat portion of the undersurface between the stops; and a seal having at least a first portion seated in the cylindrical member.

2. The system of claim 1, wherein the seal is compressed axially and expands radially when the lock member is positioned so that the lug engages the undersurface of the flange, thereby preventing water leakage between said sprinkler riser and said sprinkler riser fitting.

3. The system of claim 2 wherein said undersurface of said flange includes a camming surface, said camming surface serving to promote compression of said seal and said flat portion of the undersurface serving to seat said sprinkler riser with respect to said coupler member.

4. The system of claim 1, wherein said fitting further comprises an externally threaded fitting member carried by said coupler member and an internally threaded riser cap threadably connectable to the fitting member, said riser cap carrying said cylindrical member.

5. The system of claim 1, wherein the range of rotation is about 90 degrees.

6. An irrigation pipe coupler comprising:
a tubular member having a central longitudinal axis, a central region and first and second open ends, said first and second open ends being adapted for respective connection to first and second pipes;
a fitting including a lock member having a lug connected to a sprinkler riser and a cylindrical member attached to and in fluid communication with said tubular member, said cylindrical member terminating in a substantially annular flange, said flange having an undersurface with a flat portion and at least one gap for receiving said at least one lug, said undersurface of said flange having a plurality of stops,
whereby said sprinkler riser is connected to and released from said cylindrical member by inserting the bottom end of said sprinkler riser inside said cylindrical member, pushing said sprinkler riser into the cylindrical member in a direction towards said tubular member a distance sufficient for said at least one lug to clear one of said plurality of stops, and rotating said sprinkler riser till said lug is past said one stop, wherein said stops are spaced so as to limit a range of rotation of the lock member, when the lug is in contact with the flat portion of the undersurface between the stops; and
a seal having at least a first portion seated in the cylindrical member.

7. The irrigation pipe coupler of claim 6, wherein the seal is compressed axially and expands radially when the lock member is positioned so that the lug engages the undersurface of the flange, thereby preventing water leakage between said sprinkler riser and said sprinkler riser fitting.

8. The irrigation pipe coupler of claim 7 wherein said undersurface of said flange includes a camming surface, said camming surface serving to promote compression of said seal and said flat portion of the undersurface serving to seat said sprinkler riser with respect to said tubular member.

9. The coupler of claim 6, wherein the range of rotation is about 90 degrees.

10. The irrigation pipe coupler of claim 6, wherein said fitting further comprises an externally threaded fitting member carried by said tubular member and an internally threaded riser cap threadably connectable to the fitting, said riser cap carrying said cylindrical member.

11. The irrigation pipe coupler of claim 10, wherein the seal has a bifurcated construction such that a portion thereof is separated into spaced apart annular ridges.

12. The irrigation pipe coupler of claim 6 further comprising at least one lateral projection disposed on an outer surface of said tubular member and extending substantially tangentially thereto, each of said at least one projection including first and second end portions respectively angularly disposed toward said central longitudinal axis at an angle of about 5° to about 30° with respect to said central longitudinal axis.

13. The irrigation pipe coupler of claim 12 wherein each of said first and second end portions of said at least one projection, includes a distal edge extending outwardly from a respective one of said first and second open ends of said tubular member toward said central region thereof at an angle of about 15° to about 35° with respect to said central longitudinal axis.

14. An irrigation pipe coupler comprising:
a tubular member having a central longitudinal axis, a central region and first and second open ends, said first and second open ends being adapted for respective connection to first and second pipes;
a fitting including a cylindrical member in fluid communication with said tubular member, the fitting capable of receiving a sprinkler riser in a locking relationship with the fitting, the fitting including an externally threaded fitting member and an internally threaded fitting member threadably connectable to the externally threaded fitting member; and
a seal, compressible between the externally threaded fitting member and the internally threaded fitting member, for sealing between the cylindrical member and the sprinkler riser, wherein:
the seal has a bifurcated construction such that a portion thereof is separated into inner and outer spaced apart annular ridges,
one of the group consisting of the internally threaded fitting member and the externally threaded fitting member has a bore for receiving the seal,
the outer annular ridge of the seal has a height that is greater than a height of the bore, and
the inner annular ridge is shorter than the outer annular ridge.

15. The irrigation pipe coupler of claim 14, wherein the height of the inner annular ridge is smaller than the height of the bore.

16. An irrigation pipe coupler comprising:
a tubular member having a central longitudinal axis, a central region and first and second open ends, said first and second open ends being adapted for respective connection to first and second pipes;
a fitting including a cylindrical member in fluid communication with said tubular member, the fitting capable of receiving a sprinkler riser in a locking relationship with the fitting, the fitting including an externally threaded fitting member and an internally threaded fitting member threadably connectable to the externally threaded fitting member; and
a seal, compressible between the externally threaded fitting member and the internally threaded fitting member, for sealing between the cylindrical member and the sprinkler riser, wherein the seal seats on a seating surface of the externally threaded fitting member, the seating surface having an angle so that the seating surface is deeper at an outer circumference than at an inner circumference thereof.

17. The irrigation pipe coupler of claim 16, wherein the seal has a bifurcated construction such that a portion thereof is separated into inner and outer spaced apart annular ridges.

18. The irrigation pipe coupler of claim 16 wherein the angle is about 5 degrees.

* * * * *